United States Patent Office 3,182,735
Patented May 11, 1965

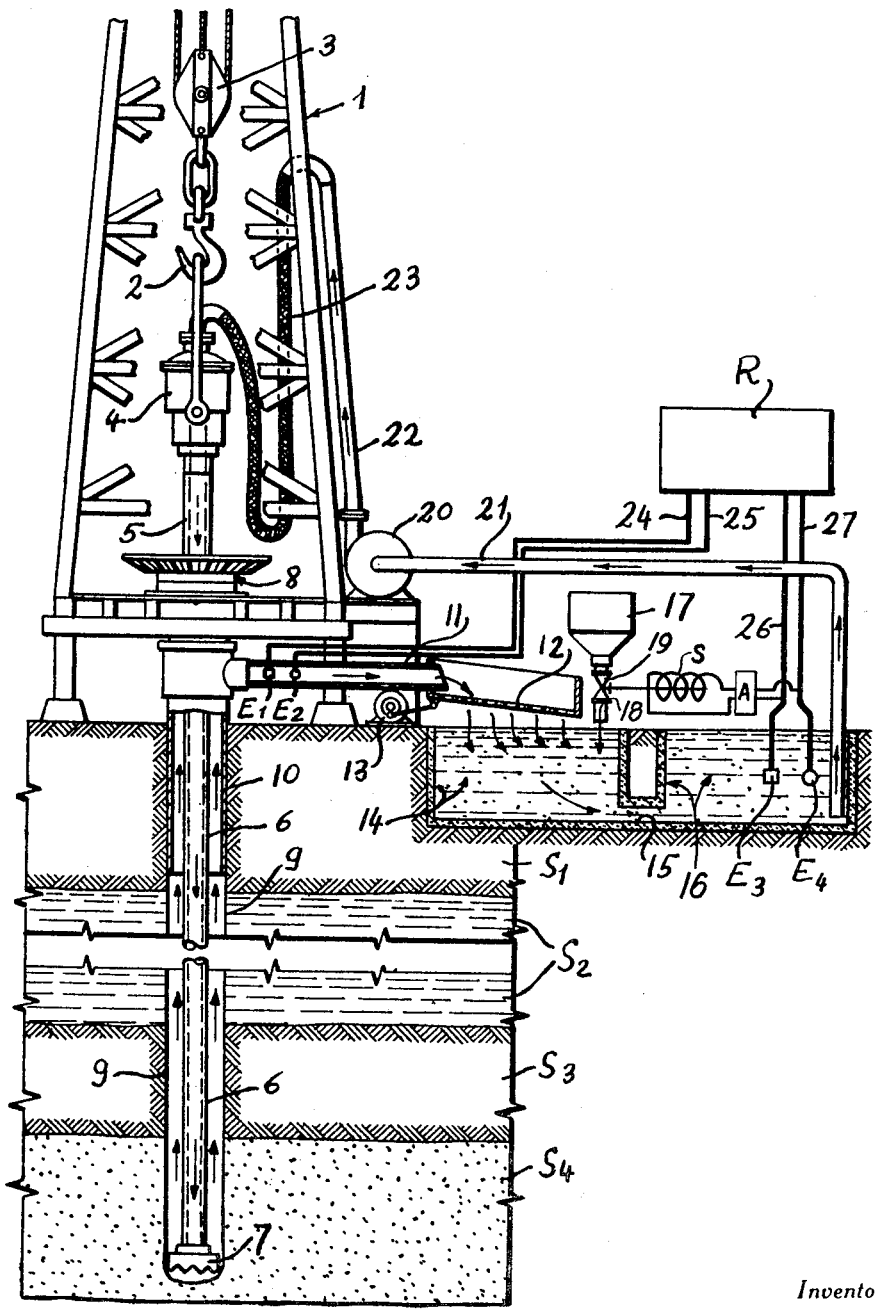

3,182,735
METHOD AND MEANS FOR LOCATING SUBSOIL FORMATIONS DURING DRILLING
Gherardo Bartolini Salimbeni, 16 Via Ciro Menotti, Florence, Italy, and Italo Veneziani, 20 Via Castiglione, Bologna, Italy
Filed Apr. 12, 1963, Ser. No. 272,565
Claims priority, application Italy, Apr. 16, 1962, 7,933/62
17 Claims. (Cl. 175—50)

The invention relates to a method and means for locating subsoil formations during drilling by continuous measurement of the reduction-oxidation or "redox" potential of the drilling mud which is circulated in the drill hole in the rotary drilling method.

In the rotary method of drilling holes, the rotation of a drilling bit is utilized, which is screwed onto the lower end of a string of drill pipes. Weight is applied to the bit as it is rotated to crush and tear the formation. The drilled particles are carried to surface by the drilling mud, which is circulated continuously during the drilling process. The mud is pumped into the drilling pipe at the surface, out through the bit, and up the annular space between the drill pipes and the walls of the hole. At the surface the drilled particles are moved from the mud by gravity settlement and shale shaker screens, and the screened mud is again pumped into the hole in a continuous circulating process.

In order to investigate the nature of the traversed strata, many methods has been proposed based on electrical logging methods, such as for instance the methods described in the U.S. Patents 1,913,293; 2,691,757; 2,694,179, and 3,098,198.

In all said known logging methods, in order to effect the measurement of the electric potentials induced in the mud inside the drill hole, such as spontaneous potentials, redox potentials, or the like, it is necessary to extract at times from the drilled hole the drill string, and to lower into the hole filled with the drill mud the usual electric log, consisting of one or more electrodes electrically connected to a potential-measuring apparatus which measures in a known manner the usual curves of resistivity, self-potential, and or other electrical characteristics.

The operation of extracting the drilling string from the hole, disassembling same, lowering the log, and again assembling and lowering the drilling string into the hole after completion of the electrical logging is time-consuming, and expensive.

Furthermore, it is not possible by said methods to know during the drilling operation the nature of the mineral strata traversed by the bit, and it is thus impossible to timely provide for the necessary steps, whenever a mineral-bearing stratum is being traversed by the bit.

A further drawback of the known electrical logging methods resides in the fact that the measure of the electric characteristics is made through a compact mud cake deposited on the walls of the hole, the so called "filter cake," which acts as a diaphragm and is a hinderance to the obtainment of an electrical equilibrium in the mud.

It has been proposed, as for instance has been described in the U.S. Patent No. 2,230,999 to provide to the measurement of the spontaneous potentials during drilling, by using a special drill bit provided with an insulated exploration electrode connected to a measuring or recording instrument by means of a cable housed within the drill string.

Said method of logging during drilling is however subjected to many drawbacks, is complex and costly, the electrode on the drill bit may be easily damaged, and the potential measure are subjected to interferences due to spurious currents, and are therefore unsuited for practical purposes.

It is therefore an important object of the present invention to provide a method for locating subsoil formations during drilling by continuous measurement of the redox potential of the drilling mud which is circulated in the drill hole in the rotary drilling process, which method eliminates all the drawbacks of the previous known methods, and permits prompt localisation of the mineral strata traversed by the bit during drilling.

According to its main characteristics feature, the method according to the invention is characterized by the steps of continuously measuring at or near the effluent hole the redox potential of the mud which is being continuously circulated through the hole, and of continuously comparing the said redox potential measurements which a reference redox potential.

According to another characteristic feature, the method of the invention is characterized by the steps of measuring and recording the redox potential of the mud before its pumping into the hole, of measuring and recording the redox potential of the mud as, or just before, it flows out from the hole, and of comparing the said redox potential measurements, by taking into account the time lag between two measurements on the same mud portion circulated through the hole.

According to a further characteristic feature of the invention, the mud, before it is circulated through the hole, is adjusted by addition of a suitable reagent to a predetermined reference value of its redox potential, which value may be that of a potential in redox equilibrium, or that of a potential shifted into the range of the oxidation or reduction values.

It is in this way possible to adjust at any moment during drilling the redox potential of the mud pumped through the hole, for instance by adding to it an oxidant or a reducing substance, and this in function of the strata traversed at that moment by the bit, so as to better determine the nature of the said strata.

As reference potential a fixed redox potential may be taken, such as for instance the one provided by a calomel electrode, or there may be taken the redox potential of the mud itself, which had been recorded during the previous cycle of circulation of the mud through the hole.

The invention will be better understood from the following detailed specification made with reference to the accompanying drawing showing diagrammatically a rotary drilling rig illustrating the arrangement of the mud circulation system in combination with the apparatus performing the present invention.

In the drawing, the apparatus as shown comprises a derrick 1 of a rotary drilling unit. In usual way, to a hoisting equipment 3, provided with a hook 2, a swivel 4 is suspended. To the swivel 4 the drill stem 5 is screwed, and to the said stem 5 the string of drill pipes 6 is secured. Onto the lower end of the string of drill pipes 6 is screwed the bit 7. The drill stem 5 is rotatably driven by a motor (not shown) through the rotary table 8, in a conventional manner.

9 is the drilled hole, provided in a well known manner at its upper end with a casing 10, extending from the hole head. Said casing 10 is provided at its upper end with a mud return line 11, opening above a shale shaker screen 12, operated by a motor 13 through a suitable transmission.

The screen 12 is mounted above a mud pit, comprising a first tank 14 and a second tank 16 communicating through a duct 15 provided near the bottom of the pit.

20 is the mud-circulating pump connected at its suction side to the tank 16 of the pit through the suction pipe 21, and connected at its delivery side, through pipe 22 and hose 23, to the swivel 4.

$S_1$, $S_2$, $S_3$, and $S_4$ are the earth strata traversed by the bore hole 9.

In operation of the just described device, the table 8, by revolving, controls the rotation of the string of drill pipes 6 and drill bit 7.

Pump 20 continuously circulates the mud, by sucking it from pit 16 through pipe 21, pumping it through pipe 2, hose 23, swivel 4, drill stem 5 down through the string of drill pipes 6, out through the bit and up through the annular space between the drill pipes 6 and the walls of the hole 9. The said mud, which carries along the particles removed by the boring of the hole by the drill bit 7, flows through the mud return line 11 and is discharged onto the shale shaker screen 12, providing for the removal of the larger-size particles from the mud. The mud then flows into tank 14 of the pit, in which tank a further settling of the heaviest mud particles takes place by gravity, and the mud so deprived of the entrained larger-size particles passes into tank 16 of the mud pit, and is thereafter again circulated through the borehole by pump 20.

According to the invention, within the mud return line 11 a redox potential-measuring reversible electrode $E_1$ and a redox potential electrode $E_2$ are mounted and electrically connected through insulated wire 24, 25 to a suitable redox potential-measuring and recording instrument R, which may be of conventional construction and does not form part of the present invention. A brief description of such an instrument is included hereinafter.

A second pair of electrodes $E_3$, and $E_4$, of which electrode $E_3$ is a redox potential-measuring reversible electrode and $E_4$ is a redox potential reference electrode, is plunged into the mud in the second tank 16 of the mud pit, the said electrodes being electrically connected through electrically insulated cables 26, 27 to the recording instrument R.

Above the first tank 14 of the mud pit a reagent container 17 is mounted, provided with a delivery spout 18 opening above the said tank 14 of the mud pit and intercepted with a hand or automatically controllable valve 19. For automatically controlling valve 19, an amplifier A is used having its input electrically connected to electrodes $E_3$ and $E_4$ and its output connected to a suitable solenoid S in turn having its plunger connected to the stem of valve 19.

With the above-described drilling rig, the potential of the mud passing through the return line 11 is continuously detected by the electrodes $E_1$, $E_2$ and transmitted to the measuring and recording instrument R. Thus due to the intimate contact of the mud with the borehole cuttings, the said redox potential will represent in an exact and heretofore not obtainable manner the oxidizing or reducing nature of the strata being drilled.

The mud is then passed into the mud pit, and its redox potential is again adjusted to a basic or reference value, that is for example to a redox potential equilibrium value, by adding to it the required amount of oxidizing or reducing substance from container 17. The thus modified redox potential of the mud is detected by electrodes $E_3$, $E_4$ continuously, before the mud is again sucked by pump 20 through line 21, and recirculated through the borehole.

The said basic or reference values of the redox potential of the mud being pumped through the hole and picked up at electrodes $E_3$, $E_4$ are compared in the recording instrument R with the mud potential picked up at electrodes $E_1$, $E_2$, taking into account the time lag between two subsequent measures by the same electrode on the same mud portions, that is the time required for a complete circulation cycle of the mud.

The instrument R comprises:

(1) An automatic recorder of the redox potential between electrodes $E_1$, $E_2$, $E_3$, $E_4$ versus time, as for instance a Leeds & Northrup two pen recorder, a Brown Electronik recorder, or a two pen Widco recorder.

(2) A "Geograph" (Reg. name) three pen recorder—Model G7 PW, which may record the rate of penetration, downtime, drilling weight, pump pressure or pump flow, manufactured by the Geolograph Co., Oklahoma City, Oklahoma as shown on page 1982 of the Composite Catalogue 1962–1963 edition.

(3) A type "D" Martin Decker Weight Indicator, with electric recording system and with pump pressure and pump stroke indicator (for volume of flow measurement) as auxiliary instruments, manufactured by the "Martin Decker" Drilling Control Instruments, Co., 3431 Cherry Avenue, Long Beach 7, California and shown on pages 3153 and 3170 of the said Composite Catalog.

With the aid of the said instruments it is possible to determine the shift in time corresponding to the time required for complete circulation of a mud portion. More particularly, in the most frequent case in which at the instant $t$ and the depth $h$ a variation of the petrographic nature of the traversed strata and hence a variation in the rate of penetration of the drilling bit takes place, the lag of time $(T-t)$ required by the mud for flowing out at the surface from the depth $h$ is automatically registered by the Geolograph.

In the less frequent instance in which at the moment $t$ and at the depth $h$ there are no variations in the rate of penetration, the said lag of time, and hence the depth $h$ are to be determined in function of the volume of mud flow by means of the said Martin Decker instrument.

In this way a continuous survey during drilling of the traversed strata may be attained and, according to a further feature of the invention, it is also possible to temporarily modify the electrical properties of the mud pumped, in accordance with the data at the recording instrument, by adding to the mud a suitable reagent, so as to shift the value of the basic or reference measurement.

It is to be noted, although the invention has been shown as employing a pair of redox potential reference electrodes $E_2$, $E_4$ it is possible to employ a single, common electrode for both measuring electrodes $E_1$, $E_3$ and said common electrode could be placed at any suitable location in the path of the mud flow.

The valve 19 of the container 17 may be operated by hand, or it may be advantageously automatically controlled through the measuring device R, by any conventional controlling device so as to feed into the mud in the tank 14 an amount of reagent such as to adjust said mud to the required basic potential.

Having now described our invention, what we claim is:

1. In the logging of subterranean formations penetrated in hole drilling operations by analyzing the oxidation-reduction potential of the drilling mud fluid continuously circulated through the drilled hole, the method of determining variations of the redox potential induced in said mud by the contact of the mud with the drilled particles, comprising the steps of: continuously adjusting the redox potential of the mud to a predetermined redox value by adding a suitable reagent to said mud before circulating it through the hole; continuously measuring said adjusted redox potential of the mud; circulating the mud through the hole; continuously measuring the redox potential of the mud effluent from the hole, and comparing the said redox measurements made on the same mud portions.

2. In the logging of subterranean formations penetrated in hole drilling operations by analyzing the oxidation-reduction potential of the drilling mud fluid continuously circulated through the drilled hole, the method of determining variations of the redox potential induced in said mud by the contact of the mud with the drilled particles, comprising the steps of: continuously measuring the redox potential of the mud before circulating it through the hole; continuously measuring the redox potential of the mud effluent from the hole; comparing the said redox measurements taking into account the time lag between two measurements on the same mud portion circulated through the hole, and adjusting the redox potential of the said mud portion by adding a suitable reagent to said mud before recirculating it through the hole to a value of a potential within the range of oxidation-reduction values in accordance to the measured redox potential difference between said two redox potential measurements.

3. In a hole drilling equipment of the type that includes a rotary drilling rig, conduit means for circulating drilling fluid through said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means and up through the hole bore surrounding the drill rig and through said mud return line back into said pit, the improved logging device comprising a first redox-potential measuring reversible electrode extending into said mud return line for contact with the mud effluent flowing therethrough, a second redox potential-measuring reversible electrode extending into said mud pit for contact with the mud contained therein, a redox potential-measuring instrument, and electrically insulated wires electrically connecting said first and second reversible electrodes to said redox potential measuring instrument.

4. A logging device according to claim 3, in which said redox potential measuring instrument is of the kind comprising means for recording the measured redox potentials picked-up at said first and second redox measuring reversible electrodes.

5. A logging device according to claim 3, in which said redox potential-measuring instrument is of the kind comprising means for recording the measured redox potentials picked-up at said first and second redox measuring reversible electrodes and for comparing the recorded measurements with a shift in time corresponding to the time required for a complete circulation of a mud portion through the hole.

6. In a hole drilling equipment of the type that includes a rotary drilling rig, conduit means for circulating drilling fluid through said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means and up through the hole bore surrounding the drill rig and through said mud return link back into said pit, the improved logging device comprising a first redox-potential measuring reversible electrode extending into said mud return line for contact with the mud effluent flowing therethrough, a second redox potential-measuring reversible electrode extending into said mud pit for contact with mud contained therein, a redox potential reference electrode in the path of circulation of said mud for contact therewith, a redox potential measuring instrument, and electrically insulated wires for electrically connecting said first and second redox potential-reversible measuring electrodes and said redox potential reference electrode to said redox potential-measuring instrument.

7. A logging device according to claim 6, in which said redox potential measuring instrument is of the kind comprising means for recording the measured redox potentials picked-up at said first and second redox measuring reversible electrodes.

8. A logging device according to claim 6, in which said redox potential-measuring instrument is of the kind comprising means for recording the measured redox potentials picked-up at said first and second redox measuring reversible electrodes and for comparing the recorded measurements with a shift in time corresponding to the time required for a complete circulation of a mud portion through the hole.

9. In a hole drilling equipment of the type that includes a rotary drilling rig, conduit means for circulating drilling fluid through said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means and up through the hole bore surrounding the drill rig and through said mud return line back into said pit, the improved logging device, comprising a first redox-potential measuring reversible electrode extending into said mud return line for contact with the mud effluent flowing therethrough, a second redox potential-measuring reversible electrode extending into said mud pit for contact with mud contained therein, a first redox potential reference electrode extending into said mud return line for contact with the mud effluent flowing therethrough, a second redox potential reference electrode in said mud pit for contact with the mud therein, a redox potential-measuring instrument, and electrically insulated wires for electrically connecting said first and second redox potential-measuring reversible electrodes and said first and second redox potential reference electrodes to said redox potential-measuring instrument.

10. A logging device according to claim 9, in which said redox potential measuring instrument is of the kind comprising means for recording the measured redox potentials picked-up at said first and second redox measuring reversible electrodes.

11. A logging device according to claim 9, in which said redox potential-measuring instrument is of the kind comprising means for recording the measured redox potentials pick-up at said first and second redox measuring reversible electrodes and for comparing the recorded measurements with a shift in time corresponding to the time required for a complete circulation of a mud portion through the hole.

12. In a hole drilling equipment of the type that includes a rotary drilling rig, conduit means for circulating drilling fluid though said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means and up through the hole bore surrounding the drill rig and through said mud return line back into said pit, the improved logging device comprising a first redox-potential measuring reversible electrode extending into said mud return line for contact with mud effluent flowing therethrough, a second redox potential-measuring reversible electrode extending into said mud pit for contact with the mud contained therein, a redox potential-measuring instrument, electrically insulated wires electrically connecting said first and second reversible electrodes to said redox potential measuring instrument, and feeding means opening into said mud pit for feeding controlled amounts of a suitable redox potential-modifying reagent to mud contained in the pit.

13. A logging device according to claim 12, in which said feeding means are provided with automatic feed-controlling valves, controlled by the said redox potential measuring instrument.

14. In a hole drilling equipment of the type that includes a rotary drilling rig, conduit means for circulating drilling fluid through said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means and up through the hole bore surrounding the drill rig and through said mud return line back into said pit, the improved logging device comprising a first redox-potential measuring reversible electrode extending into said mud return line for contact with the mud effluent flowing therethrough, a second redox potential-measuring reversible electrode extending into said mud pit for contact with mud contained therein, a redox potential reference electrode in the path of circulation of said mud for contact with the mud, a redox potential measuring instrument, electrically insulated wires electrically connecting said first and second redox potential-reversible measuring electrodes and said redox potential reference electrode to said redox potential-measuring instrument, and feeding means opening into said mud pit for feeding controlled amounts of a suitable redox potential-modifying reagent to mud contained in the pit.

15. A logging device according to claim 14, in which said feeding means are provided with automatic feed-controlling valves, controlled by the said redox potential measuring instrument.

16. In a hole drilling equipment of the type that includes a rotary drilling rig, conduit means for circulating drilling fluid through said drilling rig to the bottom of a bore hole, a mud return line for returning drilling fluid from the bore space surrounding said drilling rig to the earth's surface, a mud pit at the surface connected to said mud return line and acting as a tank, and pumping means for continuously circulating said drilling mud fluid from said pit down through said conduit means, and up through the hole bore surrounding the drill rig and through said mud return line back into said pit, the improved logging device comprising a first redox-potential measuring reversible electrode extending into said mud return line for contact with mud effluent flowing therethrough, a second redox potential-measuring reversible electrode extending into said mud pit for contact with mud contained therein, a first redox potential reference electrode extending into said mud return line for contact with mud effluent flowing therethrough, a second redox potential reference electrode in said mud pit for contact with mud therein, a redox potential-measuring instrument, electrically insulated wires electrically connecting said first and second redox potential-measuring reversible electrodes and said first and second redox potential reference electrodes to said redox potential-measuring instrument, and feeding means opening into said mud pit for feeding controlled amounts of a suitable redox potential-modifying reagent to mud contained in the pit.

17. A logging device according to claim 16, in which said feeding means are provided with automatic feed-controlling valves, controlled by the said redox potential measuring instrument.

References Cited by the Examiner
UNITED STATES PATENTS

| | | | |
|---|---|---|---|
| 2,526,857 | 10/50 | Chaney | 324—1 X |
| 2,930,967 | 2/60 | Laird et al. | 324—1 |
| 3,046,474 | 7/62 | Arps | 175—40 X |
| 3,098,198 | 7/63 | Salimbeni | 324—1 |

BENJAMIN HERSH, *Primary Examiner.*